United States Patent [19]

Sakurahara et al.

[11] Patent Number: 4,993,378
[45] Date of Patent: Feb. 19, 1991

[54] LUBRICATING OIL PASSAGE STRUCTURE FOR A CYLINDER BLOCK

[75] Inventors: Kazuo Sakurahara; Keiji Ohtus, both of Saitama, Japan

[73] Assignee: Honda Giken Kogyo Kabushiki Kaisha, Tokyo, Japan

[21] Appl. No.: 478,305

[22] Filed: Feb. 12, 1990

[30] Foreign Application Priority Data

Feb. 13, 1989 [JP] Japan .................................. 1-33343

[51] Int. Cl.⁵ .............................................. F01M 1/00
[52] U.S. Cl. ............................ 123/196 R; 123/195 R
[58] Field of Search ........... 123/196 R, 195 H, 195 R, 123/193 P; 184/6.5

[56] References Cited

U.S. PATENT DOCUMENTS

| | | | |
|---|---|---|---|
| 3,046,954 | 7/1962 | Hoffman et al. | 123/195 R |
| 4,033,312 | 7/1977 | Howe | 123/196 R |
| 4,644,853 | 2/1987 | Russell et al. | 123/193 P |
| 4,656,983 | 4/1987 | Anno | 123/196 R |
| 4,729,349 | 3/1988 | Sonoda | 123/196 R |
| 4,729,352 | 3/1988 | Fukuo et al. | 123/196 R |
| 4,753,201 | 6/1988 | Fukuo et al. | 123/196 R |
| 4,907,551 | 3/1990 | Sakono et al. | 123/196 R |

FOREIGN PATENT DOCUMENTS

| | | |
|---|---|---|
| 0204048 | 12/1986 | European Pat. Off. |
| 62-156622 | 10/1987 | Japan . |
| 63-4318 | 1/1988 | Japan . |
| 1328196 | 8/1973 | United Kingdom ........... 123/195 H |

Primary Examiner—E. Rollins Cross
Attorney, Agent, or Firm—Armstrong, Nikaido, Marmelstein, Kubovcik & Muray

[57] ABSTRACT

A lubricating oil passage structure for a cylinder block having a plurality of cylinders separated from each other by journal walls and arranged in a row, bearing bores formed in the journal walls for rotatably supporting a pair of rotary shafts in parallel with the crankshaft of the engine on either side of the cylinder row, comprising: a hollow gallery member internally defining three galleries extending in parallel with the crankshaft in the hollow gallery member, and mechanically connecting the bearing caps with each other. Lubricating oil passages extend from these oil galleries to the bearings for the crankshaft and the rotary shaft linearly and in parallel with the bolts for securing bearing caps for the crankshaft bearings to the journal walls. Thus, the lubricating oil passages can be formed in a single manner, and the lengths of the passages are minimized. Furthermore, the gallery member can effectively reinforce the journal walls.

19 Claims, 11 Drawing Sheets

LUBRICATING OIL PASSAGE STRUCTURE FOR A CYLINDER BLOCK

TECHNICAL FIELD

The present invention relates to a lubricating oil passage structure for a cylinder block for an internal combustion engine having a rotary shaft in the cylinder block in addition to a crankshaft, and in particular to such a lubricating oil passage structure for a cylinder block for an in-line, multi-cylinder internal combustion engine having a pair of rotary shafts such as counter balancer shafts rotating in synchronism with a crankshaft and arranged in the cylinder block on either side of a cylinder row.

BACKGROUND OF THE INVENTION

It is known to support a pair of balancer shafts with bearing bores provided in parts of journal walls located on either side of the cylinders and to rotate them in synchronism with the crankshaft for the purpose of cancelling the secondary unbalanced inertia force which is produced in most commonly used reciprocating piston engines for vehicles or four-stroke, in-line, four-cylinder engines. Supply of lubricating oil to the bearings of balancer shafts and a crankshaft is generally carried out by using lubricating oil passages branching out from a main gallery extending in a cylinder block side wall in parallel with the cylinder row and into different journal walls as disclosed in Japanese utility model laid open publication No. 62-156622 and Japanese utility model laid open publication No. 63-4318.

Since lubricating oil supply passages in journal walls are typically formed either by machine drilling or by combination of casting and machine drilling, the manufacturing process becomes increasingly complex, and the journal walls tend to have a reduced rigidity as the number of the parts to be lubricated in each journal wall increases, and the lubricating oil supply passages crisscrosses the interior of each journal wall. Further, unevenness of the distribution of lubricating oil to different bearings could become a problem.

BRIEF SUMMARY OF THE INVENTION

In view of such problems of the prior art, a primary object of the present invention is to provide an improved lubricating oil passage structure for a cylinder block for an internal combustion engine having a rotary shaft in addition to a crankshaft.

A second object of the present invention is to provide a lubricating oil passage structure of the above-mentioned kind which is easy to form in an automated manufacturing process.

A third object of the present invention is to provide a lubricating oil passage structure of the above-mentioned kind which can effectively reinforce the rigidity and mechanical strength of the journal walls.

A fourth object of the present invention is to provide a lubricating oil passage structure of the above-mentioned kind which permits compact design of the engine.

These and other objects of the present invention can be accomplished by providing a lubricating oil passage structure for a cylinder block having a plurality of cylinders separated from each other by journal walls and arranged in a row, first bearing bores formed in the journal walls in cooperation with bearing caps attached to associated end portions of the journal walls by threaded bolts for rotatably supporting a crankshaft in parallel with the cylinder row along longitudinal ends of the cylinders, and second bearing bores formed in the journal walls for rotatably supporting a rotary shaft in parallel with the crankshaft on one side of the cylinder row, comprising: a hollow gallery member internally defining an oil gallery extending in parallel with the crankshaft in the hollow gallery member, and mechanically connecting the bearing caps with each other; and lubricating oil passages each branching out from the oil gallery defined in the hollow gallery member into an associated one of the second bearing bores and extending in parallel with holes for receiving the threaded bolts for attaching the bearing caps to the journal walls. According to a more specific aspect of the present invention, third bearing bores are formed in the journal walls for rotatably supporting another rotary shaft in parallel with the crankshaft on the opposite side of the cylinder row, and third lubricating oil passages are provided in a similar manner as the second lubricating oil passages to lubricate the third bearing bores.

Thus, the lubricating oil supply passages leading to the bearing bores for supporting a rotary shaft may be simplified as it is formed separately from that for the crankshaft and externally of the main body of the cylider block. Further, since the gallery member may be provided separately from the cylinder block, the rigidity of the journal walls may be favorable increased by advantageous arrangement thereof. In particular, since the lubricating oil passages may be drilled in the same direction as the threaded holes for receiving the threaded botls for mounting bearing caps, the manufacturing process is extremely simplified.

Also, owing to the above mentioned structure, the lubricating oil supply passages may be passed in the shortest path without being interfered by the bolt holes for mounting the bearing caps, and the increase in the dimensions of the bearing caps can be effectively prevented.

A particulalry favorable result can be achieved when the lubricating oil passages extend from the oil gallery to the second bearing bores between an adjacent one of the threaded bolts for attaching the bearing caps to the journal walls and a plane parallel with the holes for receiving the threaded bolts and tangential to an external end of a profile of the second bearing bores, more preferably a plane parallel with the holes for receiving the threaded bolts and passing through the center of the profile of the second bearing bores. According to a preferred embodiment of the present invnetion, the lubricating oil passages are each communicated with an associated one of the second bearing bores tangentially at an internal end of the profile of the second bearing bores.

Moreover, by arranging a plurality of oil galleries for the crank journals and the bearing bores for the rotary shafts in parallel with each other, the bearing caps are thereby connected with each other in the manner of a ladder, and the rigidity of the journal walls against bending and twisting deformations can be increased even further. Preferably, center lines of the lubricating oil passages are offset slightly inwards from a center line of the oil gallery so as to maximize this effect without increasing the dimensions of the gallery member.

According to a preferred embodiment of the present invention, a communicating passage extending perpendicularly to the oil galleries and communicating the oil galleries with one another is provided adjacent to one of the bearing caps corresponding to one of the journal walls which is subjected to a relatively large load, for instance the middle journal wall of an in-line four-cylinder engine.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENT

Figure 1:
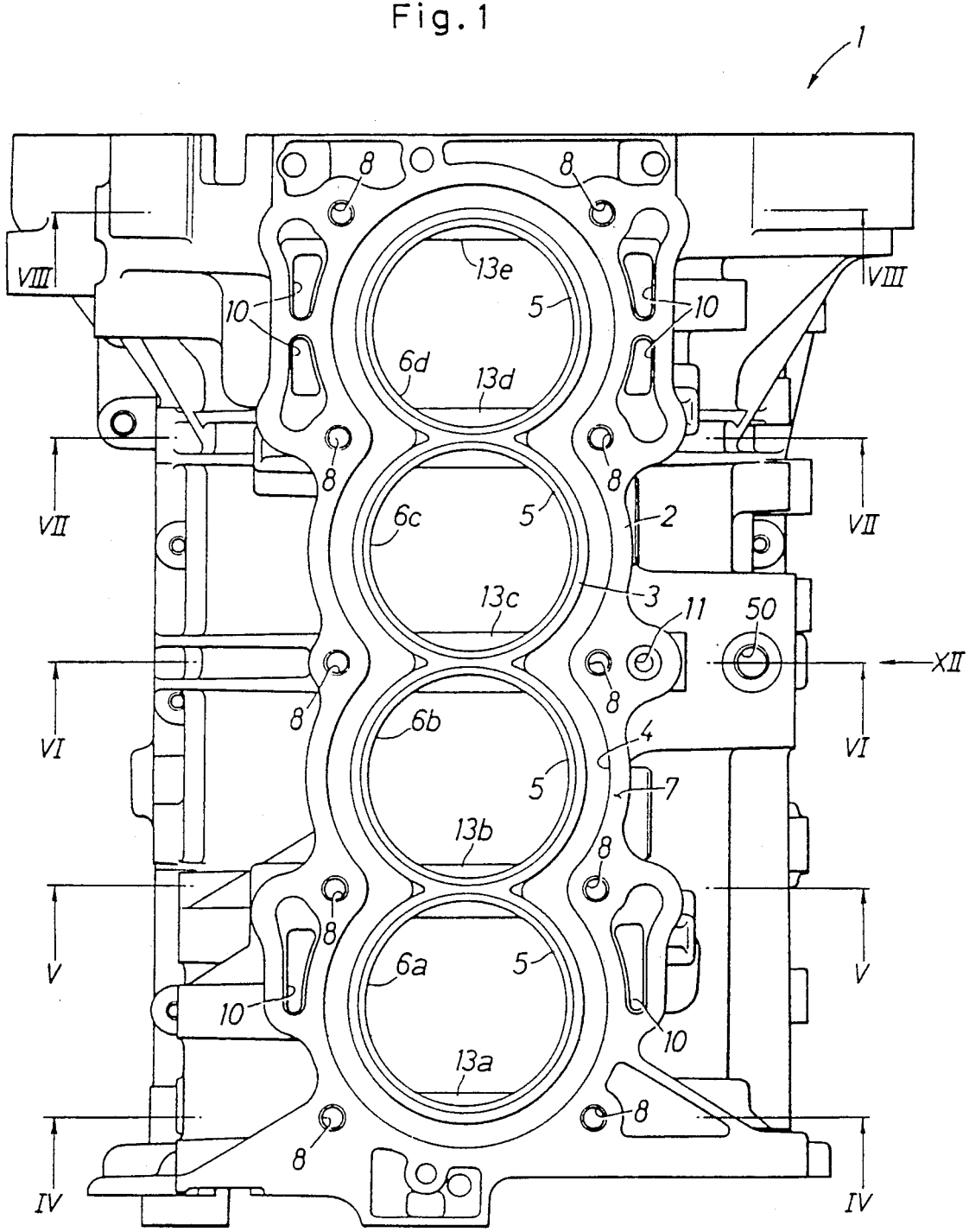
FIG. 1 is a plan view of an engine cylinder block constructed according to the present invention.

FIG. 1 is a plan view of a cylinder block 1 of an in-line four-cylinder engine constructed according to the present invention. This cylinder block 1, which is made, for instance, by casting aluminum alloy, defines a water jacket 4 between a cylinder block outer wall 2 and a cylinder block inner wall 3, and cylinder bores 6a through 6d slidably receiving pistons (not shown in the drawings) are formed by liners 5 integrally embedded in the cylinder block inner wall 5 inside the water jacket 4 during casting process.

The upper surface of the cylinder block 1 is provided with a cylinder head mounting surface 7 which is shaped into a precise and smooth plane. In the parts of the cylinder head mounting surface 7 surrounding the water jacket 4 are provided ten threaded bolt holes 8 extending in parallel with the axial lines of the cylinders substantially at equal interval, each pair of the threaded holes 8 being positioned on either side of a portion intermediate between adjacent cylinder bores 6a through 6d, and additional pairs being arranged on either side of a portion located at either longitudinal end of the cylinder row. These bolt holes 8 are provided with internal threads for receiving threaded head bolts for securing a cylinder head (not shown in the drawings) on the cylinder head mounting surface 7.

Openings 10 communicating with the interior of a crank case are formed in the cylinder head mounting surface 7 on either side of the first and the fourth cylinder bores 6a and 6d which are located on either longitudinal end of the cylinder row. These openings 10 are substantially symmetric with respect to the associated cylinder bores 6a and 6d, and one of the openings 10 for each of the cylinder bores 6a and 6d serves as an oil return passage for returning the lubricating oil which has lubricated a valve actuating mechanism in the cylinder head back to an oil pan, and the other openings 10 serve as crank case ventilating passages for allowing flow of blow-by gas between the cylinder head and the crank case. In the present embodiment, the engine is mounted on the vehicle in an inclined state (refer to FIG. 13) so that the passages located on the right hand side of FIG. 1 serve primarily as the oil return passages.

In a right hand side part of the portion of the cylinder block outer wall 2 located between the second and third cylinder bores 6b and 6c is provided a lubricating oil supply passage 11 in parallel with the threaded bolt holes 8 to supply lubricating oil to the valve actuating mechanism (not shown in the drawings).

Figure 2:
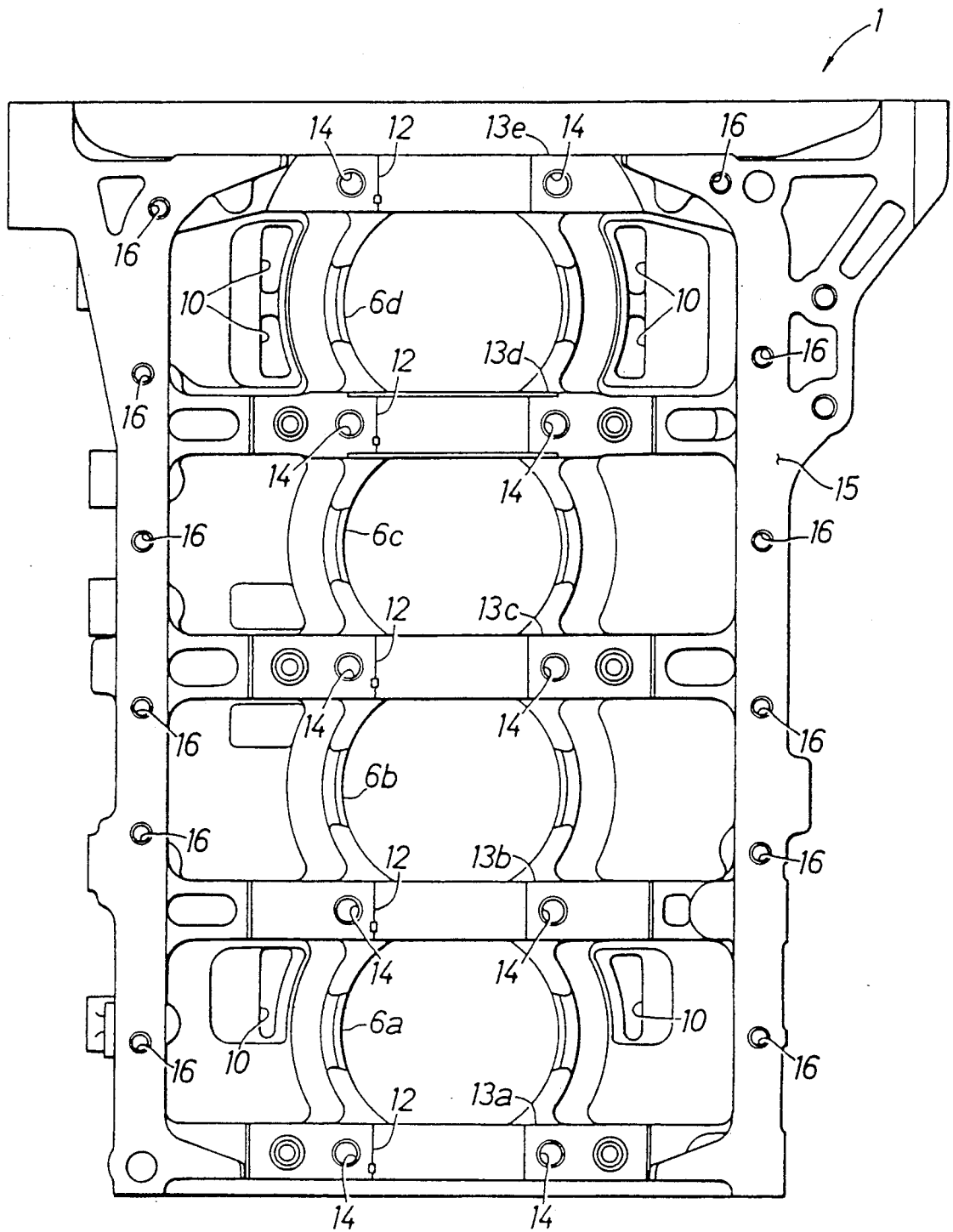
FIG. 2 is a bottom view of same.

As shown in FIG. 2, journal walls 13a through 13e defining bearing halves 12 for rotatably supporting journals of a crankshaft as described hereinafter are provided in both ends of the cylinder row and intermediate parts between the mutually adjoining cylinder bores 6a through 6d. These journal walls 12a through 13e extend in parallel with the axial lines of the cylinders, and perpendicular to the plane which is perpendicular to the cylinder axial lines, and ten bolt holes 14 are formed in the lower surfaces of the journal walls, each pair of the bolt holes being provided in each of the journal walls, to attach a bearing cap on the lower surface of each of the journal walls. The lower surface of the cylinder block 1 which is finished into a plane to attach an oil pan thereto is provided with oil pan flange 15 extending laterally outwards, and a plurality of bolt holes 16 are provided in the oil pan flange 15.

Figure 3:
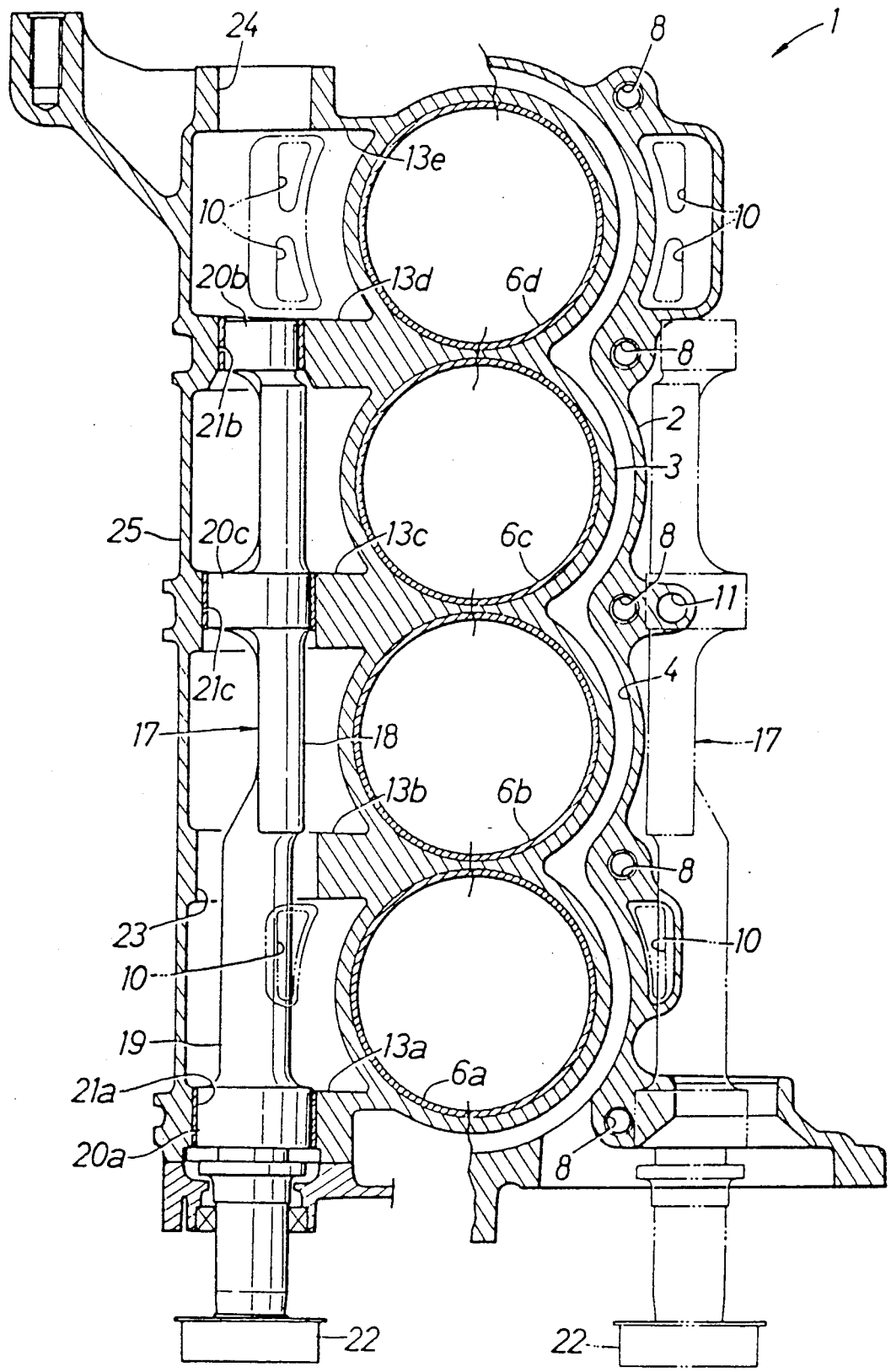
FIG. 3 is a sectional end view taken along a horizontal plane.
Figure 4:
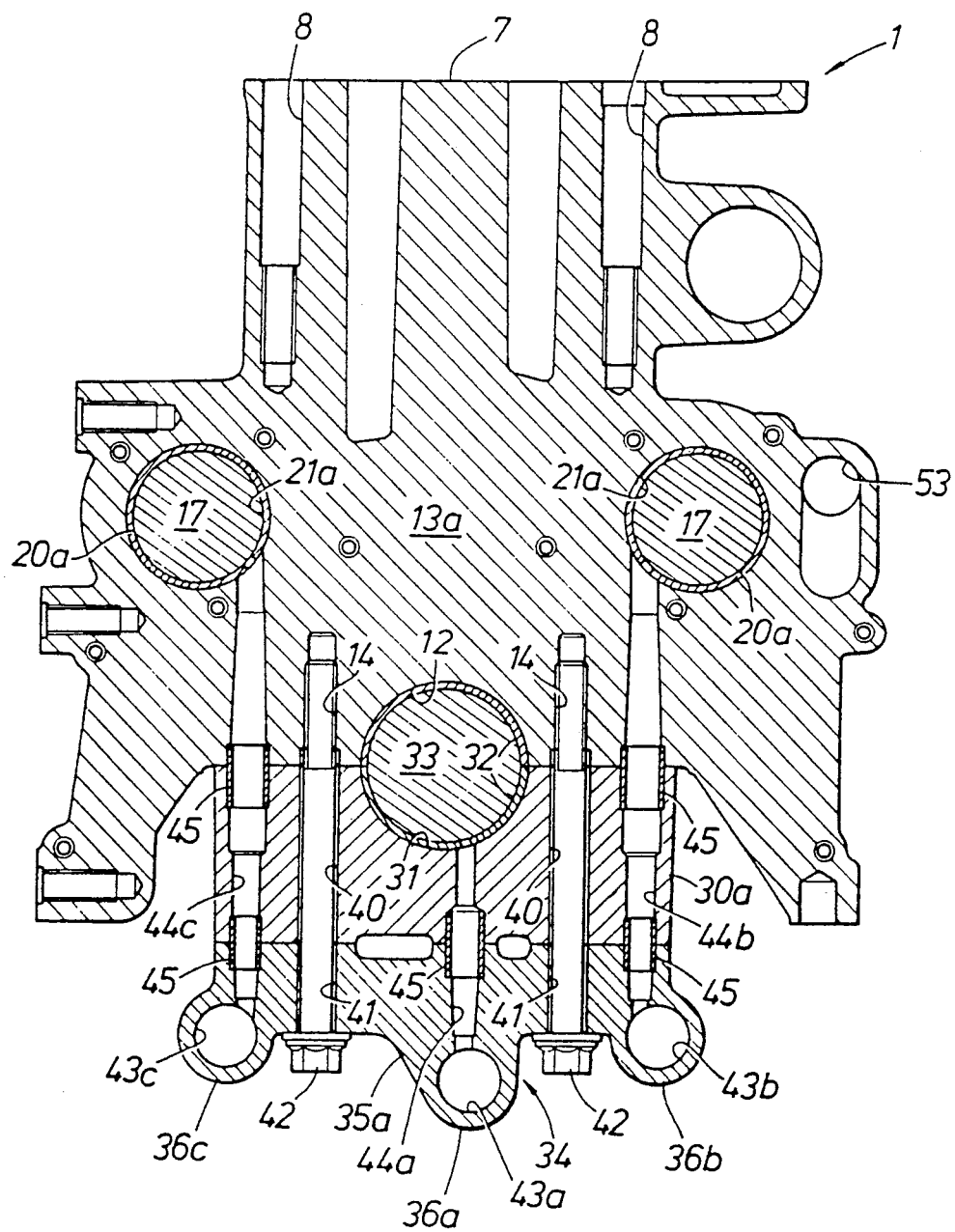
FIG. 4 is a sectional view taken along line IV—IV of FIG. 1.
Figure 5:
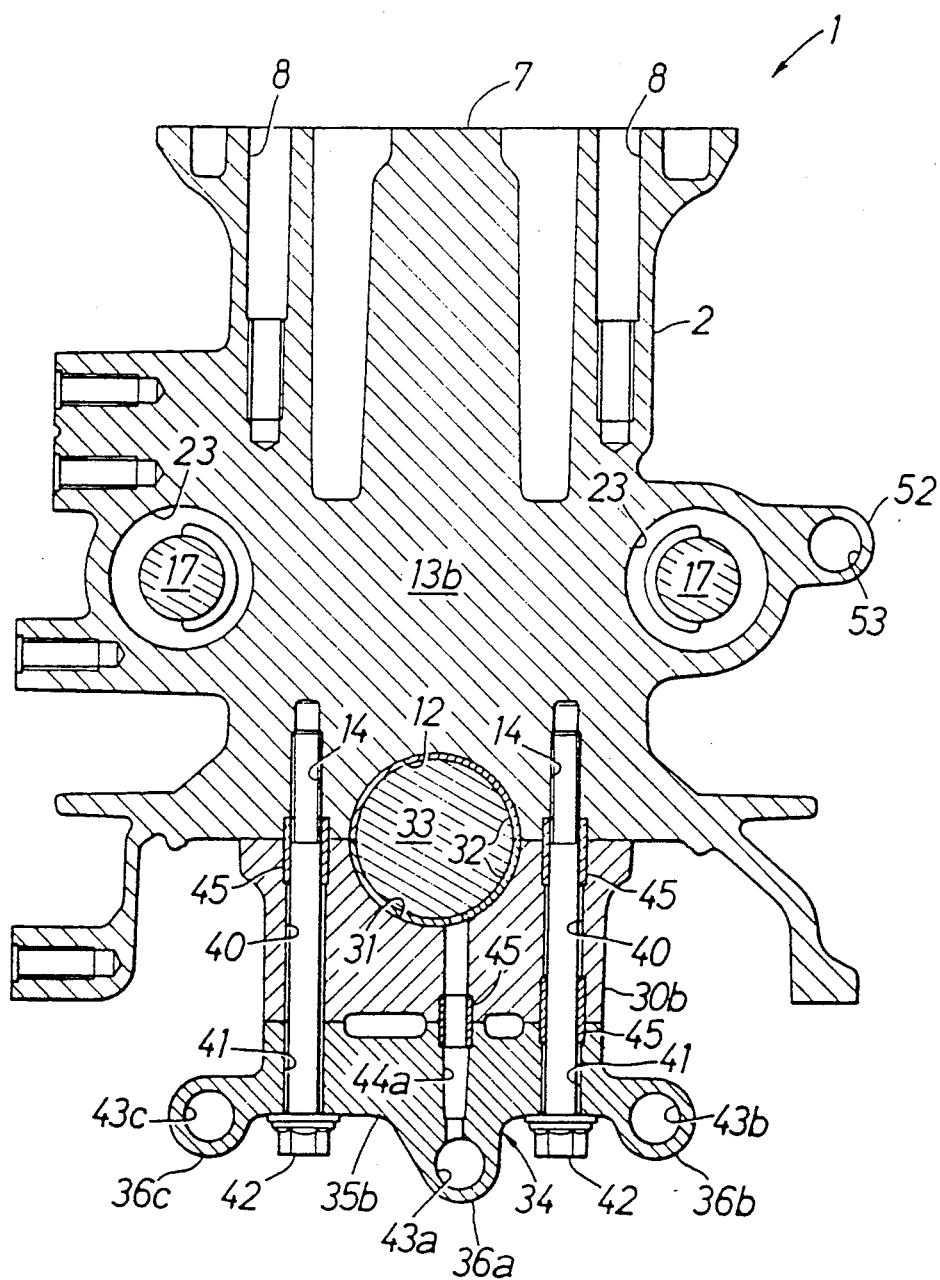
FIG. 5 is a sectional view taken along line V—V of FIG. 1.

As shown in FIG. 3, a pair of balancer shafts 17 extend in parallel with the cylinder row on either side of the first through third cylinder bores 6a through 6c. Each of the balancer shafts 17 consists of a counter weight portion 18 having a center of gravity off-set from its axial center, and an extension shaft portion 19 extending from one end of the counter weight portion 18. A first bearing potion 20a is provided at the free end of the extension shaft portion 19, a second bearing portion 20b is provided at the other end of the counter weight portion 18, and a third bearing portion 20c is provided at an intermediate part of the counter weight portion 18.

Each of the counter weight portions 18 is located on one or the other side of the second and third cylinder bores arranged along the cylinder row, and the first through third bearing portions 20a through 20c are rotatably supported by a first bearing bore 21a provided in the first journal wall 13a adjacent to the first cylinder bore 6a, a second bearing bore 21b provided in the fourth journal wall 13d located between the third and fourth cylinder bores 6c and 6d, and a third bearing bore 21c provided in the third journal wall 13c located between the second and third cylinder bores 6b and 6c, respectively.

In this way, the balancer shafts 17 are supported by the cylinder block 1 in a sufficiently rigid manner so as to control any twisting deformation of the balancer shafts 17.

As best shown in FIG. 3, the openings 10 are located in the cylinder block so as to avoid the counter weight portions 18 of the balancer shafts because the eccentric counter weight portions 18 would create undesirable resistance to the flow of blow-by gas through these openings 10. The openings 10 adjoining the cylinder bore 6a at one of the longitudinal ends of the cylinder row are each located under the associated extension shaft portion 19 but the other openings 10 adjoining the cylinder bore 6d at the other longitudinal end of the cylinder row are totally unobstructed by the balancer shafts 17 so that an unobstructed free flow of blow-by gas may be achieved through these openings 10 adjoining the latter cylinder bore 6d.

Figure 13:
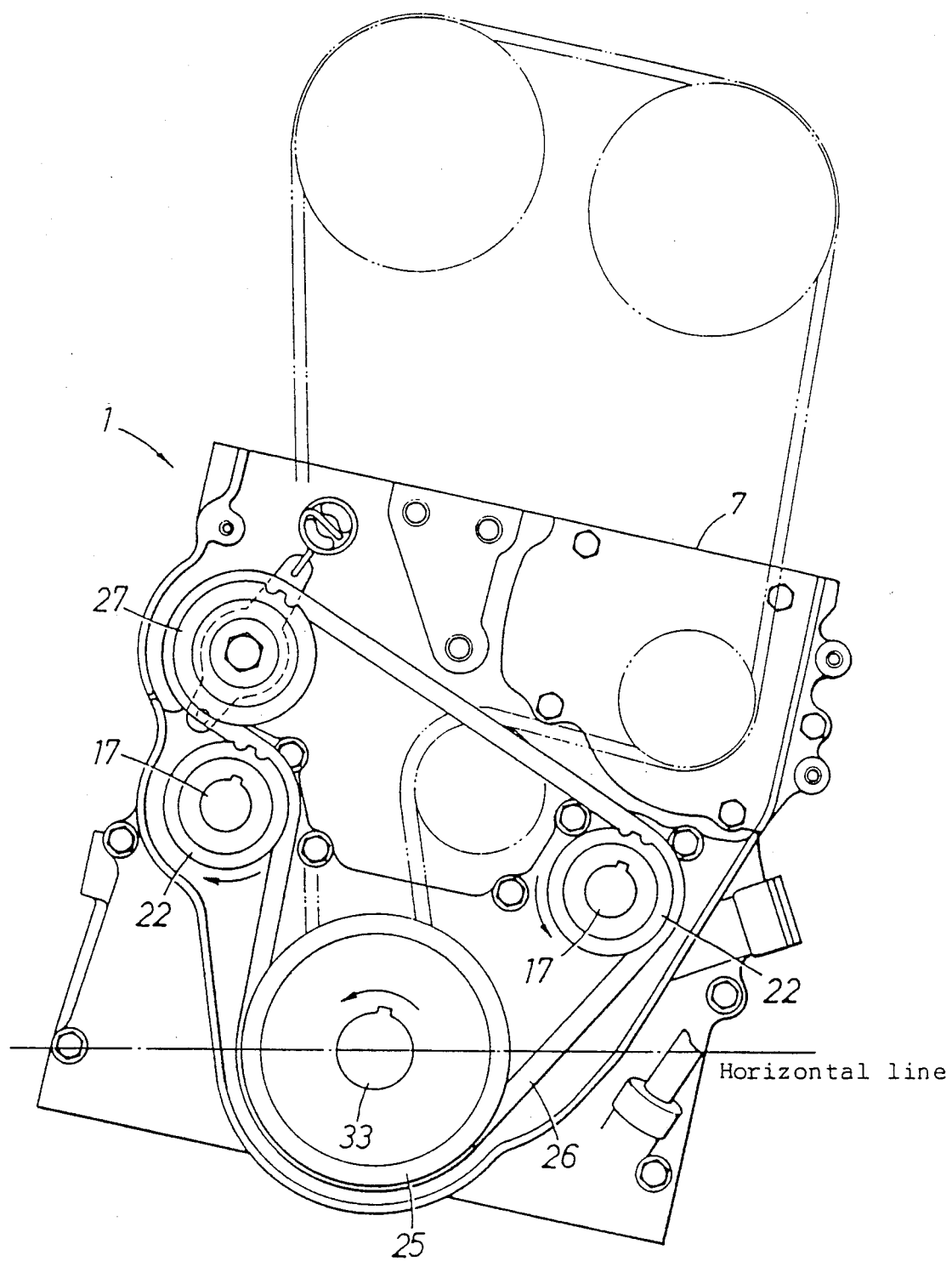
FIG. 13 is a front view of the cylinder block illustrating the arrangement of the pulleys.

One end of each of the balancer shafts 17 projecting out of the first journal wall 13a carries a timing pulley 22 securely attached thereto (refer to FIG. 13). Each of the balancer shafts 17 rotates at twice the speed of the crankshaft 33 and in opposite direction with respect to the other timing pulley 22 by passing a timing belt 26 around the timing pulleys 22 and another timing pulley 25 securely attached to the crankshaft 33. In the present embodiment, the timing belt 26 is passed around the timing pulleys and controlled by a tension pulley 27 mounted on the corresponding end surface of the cylinder block in such a manner that the timing pulley 22 on the left hand side turns in clockwise direction while the timing pulley 22 on the right hand side turns in counter clockwise direction as seen in FIGS. 1 and 3.

A large diameter bore 23 is provided in the second journal wall 13b located between the first and second cylinder bores 6a and 6b to pass the second and third bearing portions 20b and 20c therethrough, and the fifth journal wall 13e adjacent to the fourth cylinder bore 6d is provided with a tool access opening 24 for the convenience of machining the second bearing bore 21b. This tool access opening 24 is closed by mounting a transmission case (not shown in the drawings) thereon.

As shown in FIGS. 4 through 8, the lower surfaces of the journal walls 13a through 13e which are finished into smooth planes are each centrally provided with one of the aforementioned bearing halves 12, and bearing caps 30a through 30e are securely mounted on these lower surfaces.

Each of the bearing caps 30a through 30e is provided with a smooth and planar upper surface which abuts the lower surface of the associated journal wall 13a through 13e, and the upper surface of each of the bearing caps 30a through 30e is centrally provided with a bearing half 31 corresponding to one of the bearing halves 12. These bearing halve 12 and 31 define substantially circular bearing profiles into each of which is fitted a bearing metal 32 for rotatably supporting the crankshaft 33. The lower surface of each of the bearing caps 30a through 30e is also finished flat so that they may be joined together by attaching a gallery member 34 thereto.

The gallery member 34 which is made by integral casting comprises a plurality of legs 35a through 35e which are attached to the lower surfaces of the bearing caps 30a through 30e, and three hollow portions 36a through 36c which connect the legs 35a through 35e with one another along the direction of the cylinder row. The first hollow portion 36a or the central one of the hollow portions 36a through 36c connects the lower ends of all the leg portions 35a through 35e with each other, and the second and third hollow portions 36b and 36c extending along either side of the first hollow portion 36a connect the outer and lower ends of the first through fourth leg portions 35a through 35d substantially immediately below the associated balancer shafts 17. By thus extending the hollow portions 36b and 36c located on either side along the outer and lower ends of the leg portions 35a through 35d, the rigidity of the gallery member 34 can be ensured in a simple and efficient manner. Further, a connecting member 37 extends across the fourth leg portion 35d and the fifth leg portion 35e on each side of the first hollow member 36a. The hollow portions 36a through 36c are connected to each other by a connecting tube 38 extending perpendicularly to the hollow portions 36a through 36c to communicate the interiors of the hollow members 36a through 36c with each other. Axial ends of the hollow portions 36a through 36c, and the connecting tube 38 are closed by plugs 39.

The bearing caps 30a through 30e and the leg portions 35a through 35e of the gallery member 34 are provided with bolt holes 40 and 41 at those parts corresponding to the bolt holes 14 of the journal walls 13a through 13e in a coaxial manner. By passing a pair of bolts 42, for each of the journal walls 13a through 13e, through the associated bolt holes 14 via the bolt holes 40 and 41, the bearing caps 30a through 30e and the leg portions 35a through 35e are integrally attached to the associated journal walls 13a through 13e.

From a first oil gallery 43a defined in the center of the first hollow member 36a branched out into branched oil passages 44a each of which communicates with the interior of an associated one of bearing metals 32 by passing through the associated one of the leg portions 35a through 35e, the associated one of the bearing caps 30a through 30e, and the associated one of the journal walls 13a through 13e. From second and third oil galleries 43b and 43c defined in the second and third hollow members 36b and 36c located on either side of the first hollow member 36a branch out into branched oil passages 44b and 44c, respectively, which communicate with the interiors of the associated bearing bores 21a through 21c supporting the balancer shafts 17 by passing through the first, third and fourth leg portions 35a, 35c and 35d, the associated bearing caps 30a, 30b and 30c and the journal walls 13a, 13c and 13d, respectively. These branched oil passages 44a, 44b and 44c extend in parallel with the bolt holes 14, 40 and 41, and the parts of the side branched passages 44b and 44c located in the journal walls 13a, 13c and 13d are formed during the casting process so that the volume of the excess parts may be reduced, and a favorable casting result may be obtained.

The side branched oil passages 44b and 44c are located centrally between the axial lines of the adjacent bolt holes 14, 40 and 41 and the axial centers of the balancer shafts 17, and are connected to the second and third oil galleries 43b and 43c at parts which are located more outwards than the axial centers of the second and third oil galleries 43b and 43c. A favorable result can be achieved when the lubricating oil passages 44b and 44c extend from the oil galleries 43b and 43c to the bearing bores 21a between an adjacent one of the threaded bolts 42 and a plane parallel with the holes 14, 40 and 41 for receiving the threaded bolts 42 and tangential to an external end of a profile of the 21a bearing bores. Thereby, the dimensions of the bearing caps may be controlled, and the influences of the bolt holes 40 and 41 thereon may be avoided. And, as mentioned earlier, since the second and third hollow members 36b and 36c are located substantially exactly under the balancer shafts 17, the side branched oil passages 44b and 44c may have minimum lengths.

At each of the junctions of the bolt holes 40 and 41 and the branched oil passages 44a, 44b and 44c at the interfaces between the journal walls, the bearing caps and the leg portions, a hollow locating pin 45 is placed across the adjoining two parts.

Figure 6:
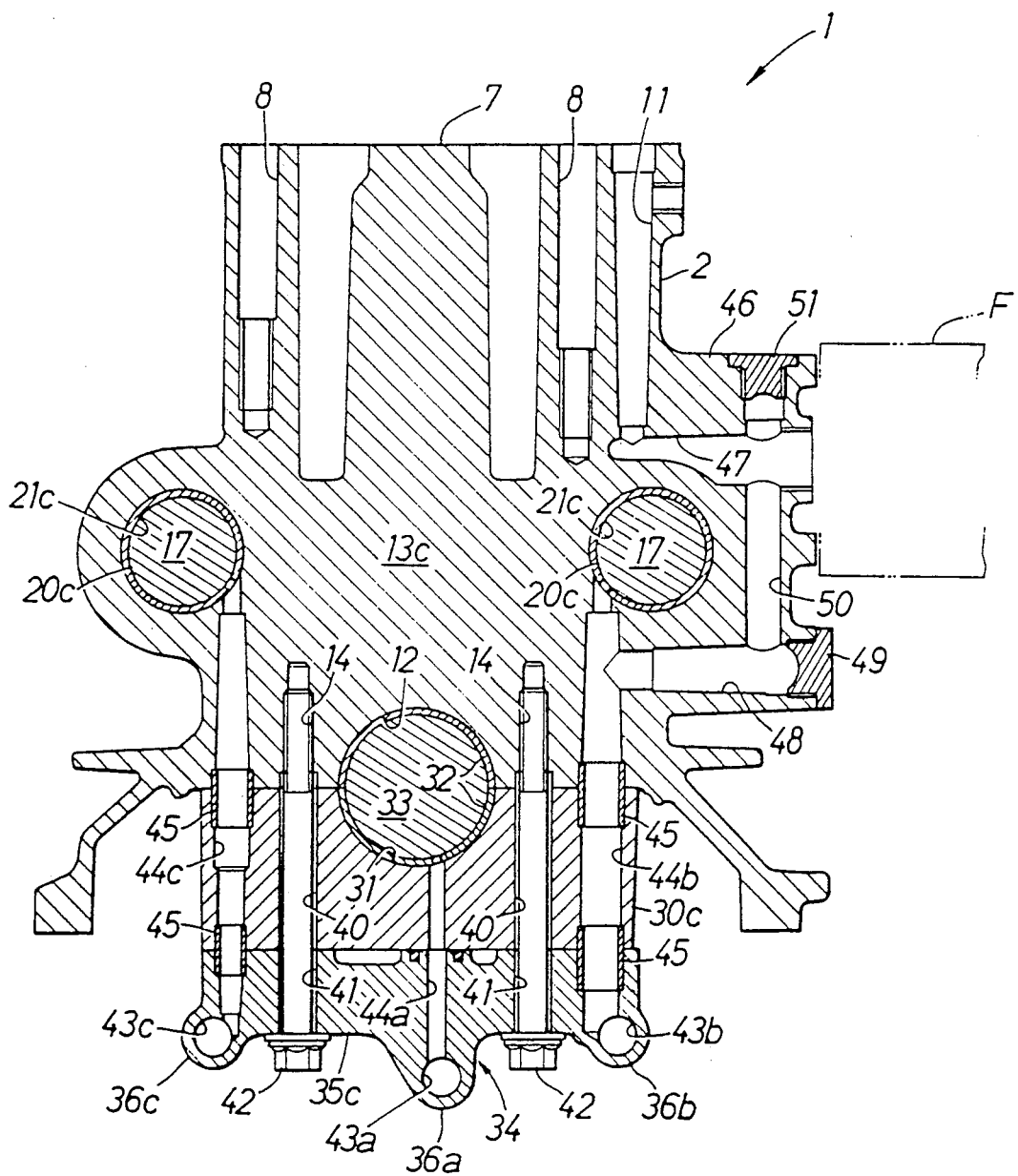
FIG. 6 is a sectional view taken along line VI—VI of FIG. 1.
Figure 7:
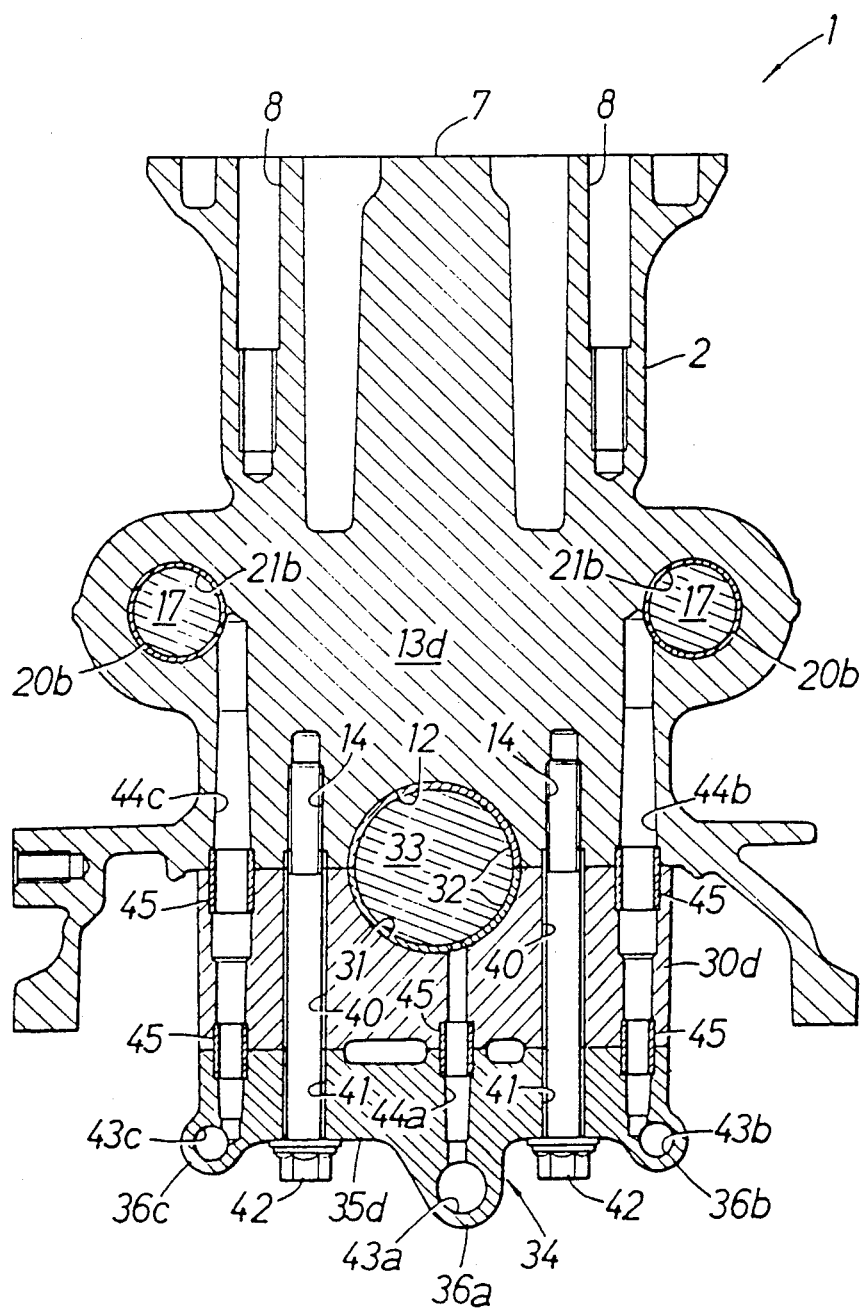
FIG. 7 is a sectional view taken along line VII—VII of FIG. 1.
Figure 8:
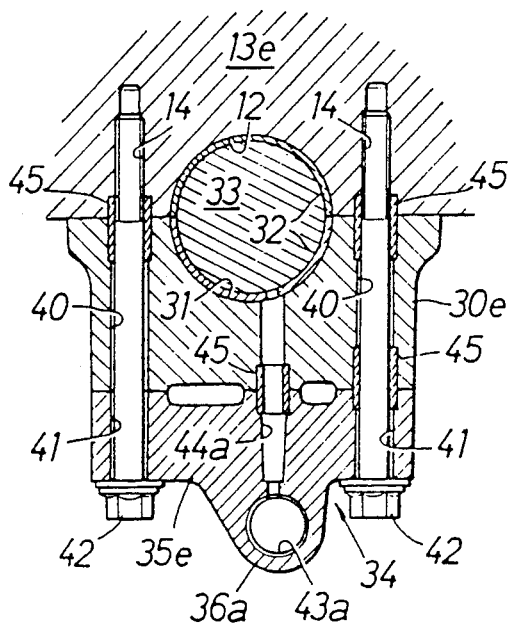
FIG. 8 is a fragmentary sectional view taken along line VIII—VIII of FIG. 1.
Figure 11:
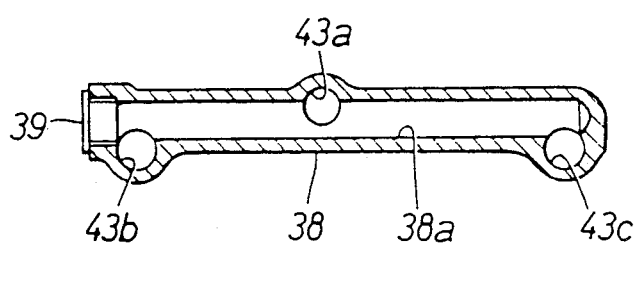
FIG. 11 is a sectional view taken along line XI—XI of FIG. 9.
Figure 10:
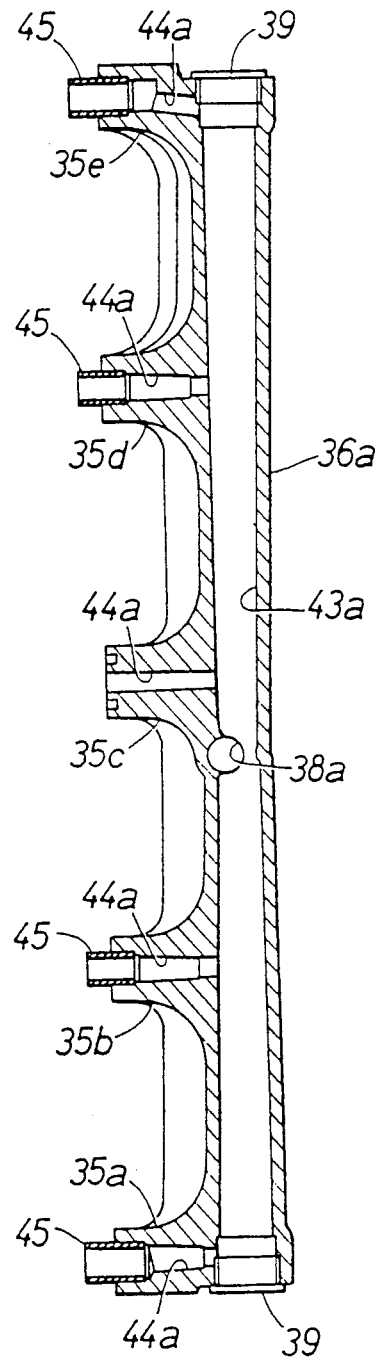
FIG. 10 is a sectional view taken along line X—X of FIG. 9.
Figure 9:
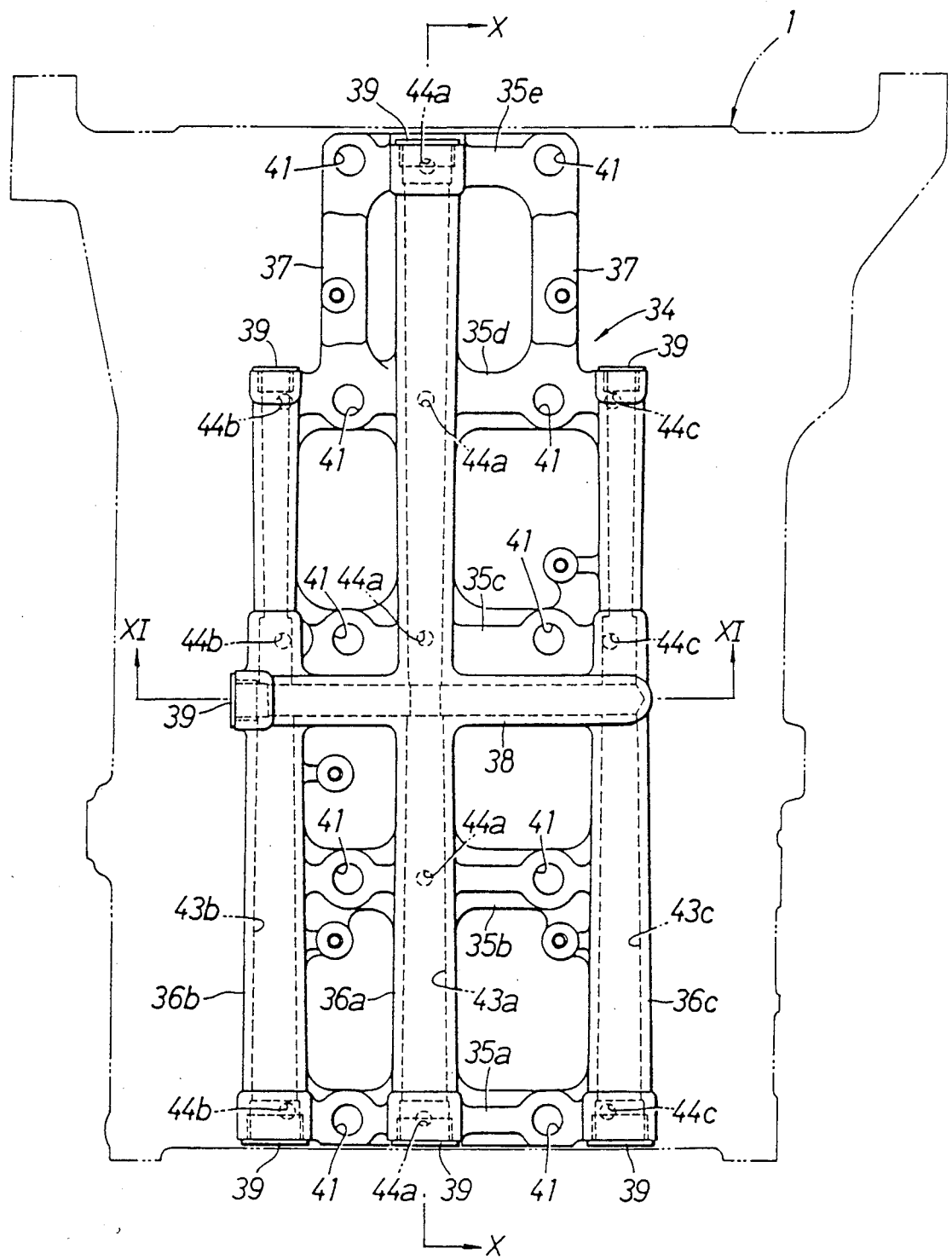
FIG. 9 shows the gallery member as seen from the bottom end of the cylinder block.

The lubricating oil supply passage 11 for supplying lubricating oil to the valve actuating mechanism extends from the cylinder head mounting surface 7 to a part slightly above the third bearing bore 21c between the center of the adjacent bolt hole 8 for securing the cylinder head and the center of the third bearing bore 21c as shown in FIG. 6. On a side surface of the cylinder block wall 2 corresponding to the third journal wall 13c through which the lubricating oil supply passage 11 is formed is provided an island portion 46 for mounting an oil filter F thereon. Inside the third journal wall 13c and the island portion 46 are provided an upper horizontal passage 47 extending between an end surface of the island portion 46 and the lubricating oil passage 11 above the third bearing bore 21 along a direction perpendicular to the cylinder axial line, and a lower horizontal passage 48 communicating a side surface of the cylinder block wall 2 with an end of the branched oil passage 44b below the third bearing bore 21c along a direction perpendicular to the cylinder axial line. The upper horizontal passage 47 is provided with an inner threaded portion at its open end for threading the oil filter F therein, and is cast into a tapered shape at its inner end to avoid interference with the third bearing bore 21c. The open end of the lower horizontal passage 48 is closed by a plug 49. A vertical passage 50 extends downwards from the upper surface of the island portion 46 in parallel with the cylinder axial line at a position externally of the third bearing bore 21c to communicate the two passages 48 and 48 with each other. The open end of this vertical passage 50 is also closed by a plug 51.

Figure 12:
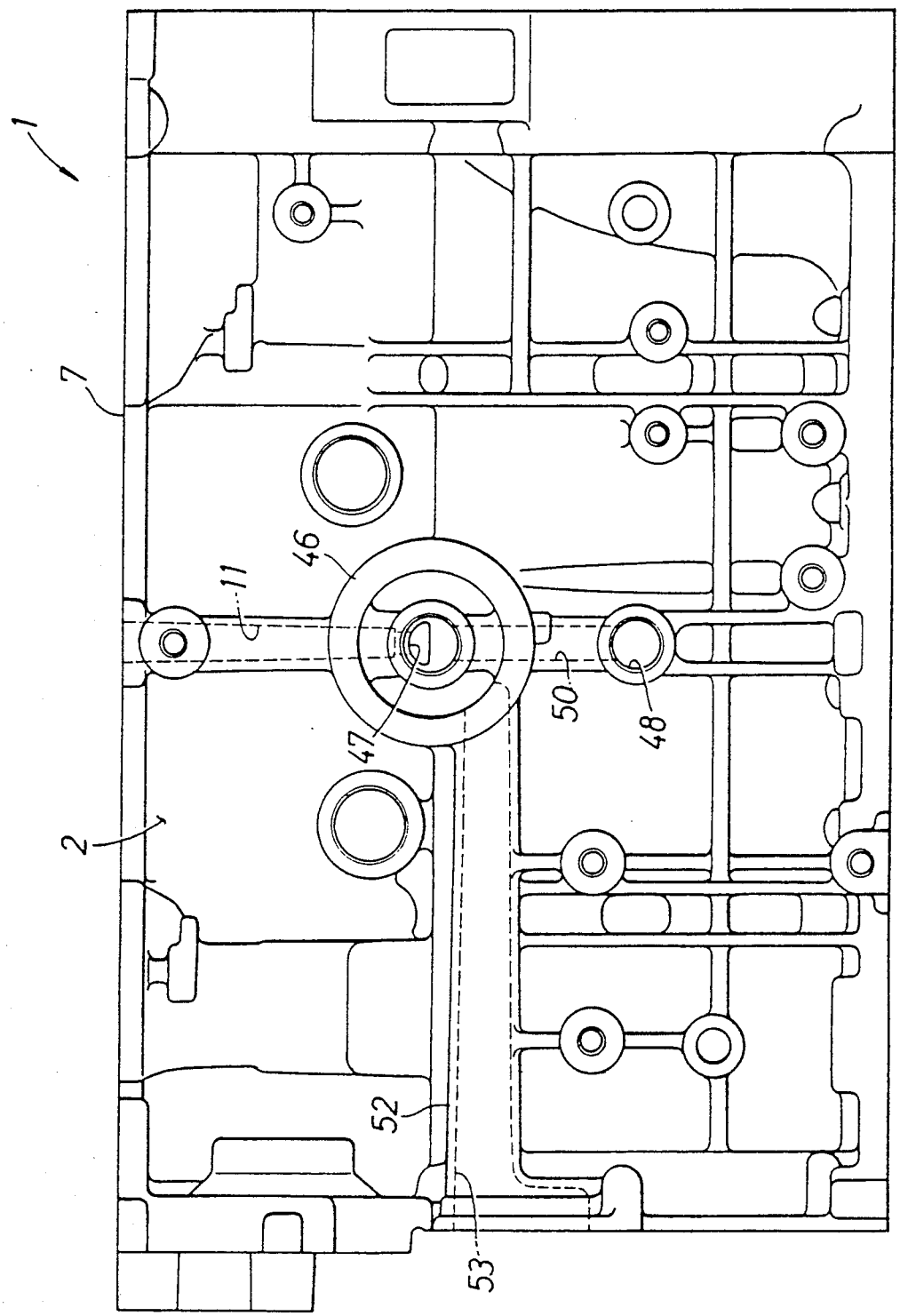
FIG. 12 is a side view as seen in direction XI—XI of FIG. 1.

Referring also to FIG. 12, supply of lubricating oil to the oil filter F is conducted through a first supply passage 53 internally defined in a ridge 52 extending along the axial line of the balancer shaft 17 in the side surface of the cylinder block wall 2.

One of the side branched oil passages 44b of the third journal wall 13c is not only a lubricating oil supply passage for the third bearing bore 21c but also a branched oil passage for conducting the lubricating oil which has been routed to the oil filter F to the second oil gallery 43b.

Now the flow of lubricating oil is described in the following.

The lubricating oil which is supplied from the oil pump (not shown in the drawings) under pressure flows into the oil filter F via the first oil supply passage 53. The lubricating oil which has been filtered by the oil filter F diverges into the upper horizontal oil passage 47 and the vertical oil passage 50, and is then supplied to the cylinder head via the lubricating oil supply passage 11 on the one hand and to one of the side branched oil passages 44b in the third journal wall 13c via the lower horizontal oil passage 48 on the other hand. A part of the lubricating oil flows upwards through the side branched oil passage 44b, and flows out from the third bearing bore 21c. A part of the lubricating oil which has flown downwards through the side branched oil passage 44b flows out from the first and second bearing bores 21a and 21b provided in the first and fourth journal walls 13a and 13d via the second oil gallery 43b and the side branched oil passage 44b branching out there-from. The lubricating oil remaining after being distributed to the first oil gallery 43a and the third oil gallery 43c via the communicating oil passage 38a defined in the connecting tube 38 is supplied to the crank journal portions via the central branched oil passage 44a and the bearing bores 21a through 21c for the other balancer shaft 17 via the other side branched oil passage 44c.

In an engine having a crankshaft and a pair of balancer shafts on either side thereof, each journal wall is provided with three bearings. Therefore, the passages for supplying lubricating oil to these bearings tend to be highly complex. Therefore, according to the present invention, oil galleries internally defining three hollow portions are provided so as to connect the bearing caps 30a through 30e attached to the lower surfaces of the journal walls 13a through 13e, for supporting the crankshaft, with each other and so as to correspond to the respective shafts, with oil supply passages leading various bearings being branched out from the oil galleries. In this way, by using oil galleries which are separate from the cylinder block, the manufacturing of the engine is simplified as compared with the engine structure using a cylinder block internally provided with oil galleries, and factors for reducing mechanical strength can be eliminated. Further, since the branched oil passages extending from the oil galleries to the bearings are in parallel with the holes for receiving threaded bolts, a step of replacing tools can be eliminated during the drilling process, and the manufacturing process is simplified.

Additionally, in order to achieve a smooth operation of an engine, it is desirable to increase the rigidity of the structure supporting the crankshaft, and this can be accomplished in highly desirable manner by connecting the bearing caps 30a through 30e with a plurality of hollow members 36a through 36c in the manner of a ladder. In particular, in a four cylinder engine in which the third journal wall bears the largest inertia force of all the journal walls, this portion can be effectively reinforced by providing the connecting tube 38 so as to connect the hollow members 36a though 36c in the vicinity of the third journal wall 13c.

Thus, according to the present invention, since passages for supplying lubricating oil to a plurality of bearing portions provided in journal walls can be achieved in a highly organized fashion, and a significant advantage can be gained in simplifying the manufacturing process. Furthermore, since the bearing caps are connected by a plurality of hollow portions in the manner of a ladder, the rigidity of the journal walls can be improved against both bending and twisting deformations, and a significant advantage can be gained in improving the performance of the engine.

What we claim is:

1. A lubricating oil passage structure for a cylinder block having a plurality of cylinders separated from each other by journal walls and arranged in a row, first bearing bores formed in said journal walls in cooperation with bearing caps attached to associated end portions of said journal walls by threaded bolts for rotatably supporting a crankshaft in parallel with said cylinder row along longitudinal ends of said cylinders, and second bearing bores formed in said journal walls for rotatably supporting a rotary shaft in parallel with said crankshaft on one side of said cylinder row, comprising:

a hollow gallery member internally defining an oil gallery extending in parallel with said crankshaft in said hollow gallery member, and mechanically connecting said bearing caps with each other; and lubricating oil passages each branching out from said oil gallery defined in said hollow gallery member into an associated one of said second bearing bores and extending in parallel with holes for receiving said threaded bolts for attaching said bearing caps to said journal walls.

2. A lubricating oil passage structure for a cylinder block according to claim 1, wherein said lubricating oil passages extend from said oil gallery to said second bearing bores between an adjacent one of said threaded bolts for attaching said bearing caps to said journal walls and a plane parallel with said holes for receiving said threaded bolts and tangential to an external end of a profile of said second bearing bores.

3. A lubricating oil passage structure for a cylinder block according to claim 2, wherein said lubricating oil passages are disposed between an adjacent one of said threaded bolts for attaching said bearing caps to said journal walls and a plane parallel with said holes for receiving said threaded bolts and passing through the center of said profile of said second bearing bores.

4. A lubricating oil passage structure for a cylinder block according to claim 2, wherein said lubricating oil passages are each communicated with an associated one of said second bearing bores tangentially at an internal end of said profile of said second bearing bores.

5. A lubricating oil passage structure for a cylinder block according to claim 4, wherein center lines of said lubricating oil passages are offset slightly inwards from a center line of said oil gallery.

6. A lubricating oil passage structure for a cylinder block according to claim 1, wherein said rotary shaft consists of a balancer shaft for cancelling an unbalanced force of a reciprocating piston engine.

7. A lubricating oil passage structure for a cylinder block according to claim 1, wherein said hollow gallery member further defines another oil gallery extending in parallel with said gallery, a plurality of lateral members integrally joining said two galleries in the manner of a ladder.

8. A lubricating oil passage structure for a cylinder block having a plurality of cylinders separated from each other by journal walls and arranged in a row, first bearing bores formed in said journal walls in cooperation with bearing caps attached to associated end portions of said journal walls by threaded bolts for rotatably supporting a crankshaft in parallel with said cylinder row along longitudinal ends of said cylinders, and second bearing bores formed in said journal walls for rotatably supporting a rotary shaft in parallel with said crankshaft on one side of said cylinder row, comprising:

a hollow gallery member internally defining a first oil gallery and a second oil gallery extending in parallel with said crankshaft in said hollow gallery member, and mechanically connecting said bearing caps with each other;

first lubricating oil passages each branching out from said first oil gallery defined in said hollow gallery member into an associated one of said first bearing bores; and second lubricating oil passages each branching out from said second oil gallery defined in said hollow gallery member into an associated one of said second bearing bores.

9. A lubricating oil passage structure for a cylinder block according to claim 8, wherein said first lubricating oil passages and said second lubricating oil passages extend in parallel with holes for receiving said threaded bolts for attaching said bearing caps to said journal walls.

10. A lubricating oil passage structure for a cylinder block according to claim 8, wherein said rotary shaft consists of a balancer shaft for cancelling an unbalanced force of a reciprocating piston engine.

11. A lubricating oil passage structure for a cylinder block according to claim 8, wherein said gallery member comprises two mutually parallel tubular portions each defining one of said oil galleries and lateral members connecting said tubular portions each other in the manner of a ladder.

12. A lubricating oil passage structure for a cylinder block according to claim 11, wherein a communicating passage communicating said oil galleries with one another is provided adjacent to one of said bearing caps corresponding to one of the journal walls which is subjected to a relatively large load.

13. A lubricating oil passage structure for a cylinder block according to claim 12, wherein said communicating passage extends perpendicularly to said oil galleries.

14. A lubricating oil passage structure for a cylinder block having a plurality of cylinders separated from each other by journal walls and arranged in a row, first bearing bores formed in said journal walls in cooperation with bearing caps attached to associated end portions of said journal walls by threaded bolts for rotatably supporting a crankshaft in parallel with said cylinder row along longitudinal ends of said cylinders, and second and third bearing bores formed in said journal walls for rotatably supporting a pair of rotary shafts in parallel with said crankshaft on either side of said cylinder row, comprising:

a hollow gallery member internally defining a first oil gallery, a second oil gallery and a third oil gallery extending in parallel with said crankshaft in said hollow gallery member, and mechanically connecting said bearing caps with each other;

first lubricating oil passages each branching out from said first oil gallery defined in said hollow gallery member into an associated one of said first bearing bores;

second lubricating oil passages each branching out from said second oil gallery defined in said hollow gallery member into an associated one of said second bearing bores; and third lubricating oil passages each branching out from said third oil gallery defined in said hollow gallery member into an associated one of said third bearing bores.

15. A lubricating oil passage structure for a cylinder block according to claim 14, wherein said first lubricating oil passages, said second lubricating oil passages and said third lubricating oil passages extend in parallel with holes for receiving said threaded bolts for attaching said bearing caps to said journal walls.

16. A lubricating oil passage structure for a cylinder block according to claim 14, wherein said rotary shafts consists of balancer shafts for cancelling an unbalanced force of a reciprocating piston engine.

17. A lubricating oil passage structure for a cylinder block according to claim 14, wherein said gallery member comprises three mutually parallel tubular portions each defining one of said oil galleries, and lateral members connecting said tubular portions each other in the manner of a ladder.

18. A lubricating oil passage structure for a cylinder block according to claim 14, wherein a communicating passage communicating said oil galleries with one another is provided adjacent to one of the bearing caps corresponding to one of the journal walls which is subjected to a relatively large load.

19. A lubricating oil passage structure for a cylinder block according to claim 18, wherein said communicating passage extends perpendicularly to said oil galleries.

* * * * *